United States Patent
Jin

(10) Patent No.: US 11,388,673 B2
(45) Date of Patent: Jul. 12, 2022

(54) CONTROL METHOD AND DEVICE

(71) Applicant: Lenovo (Beijing) Co., Ltd., Beijing (CN)

(72) Inventor: Lei Jin, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 96 days.

(21) Appl. No.: 16/913,547

(22) Filed: Jun. 26, 2020

(65) Prior Publication Data

US 2020/0413344 A1 Dec. 31, 2020

(30) Foreign Application Priority Data

Jun. 28, 2019 (CN) .......................... 201910580518.X

(51) Int. Cl.
*H04W 4/00* (2018.01)
*H04W 52/02* (2009.01)
*H04W 76/30* (2018.01)
*H04W 76/14* (2018.01)
*H04W 4/80* (2018.01)
*H04W 76/11* (2018.01)

(52) U.S. Cl.
CPC ......... *H04W 52/0274* (2013.01); *H04W 4/80* (2018.02); *H04W 76/11* (2018.02); *H04W 76/14* (2018.02); *H04W 76/30* (2018.02)

(58) Field of Classification Search
CPC . H04W 52/0274; H04W 76/14; H04W 76/30; H04W 4/80; H04W 76/11; H04W 52/02
USPC .......................................... 370/329, 328, 338
See application file for complete search history.

(56) References Cited

U.S. PATENT DOCUMENTS

| | | | | |
|---|---|---|---|---|
| 9,961,523 | B1* | 5/2018 | Daoura | .................... H04W 4/12 |
| 2014/0171055 | A1* | 6/2014 | Oshita | .................... H04W 12/12 |
| | | | | 455/418 |
| 2014/0273858 | A1* | 9/2014 | Panther | .............. A61B 5/02427 |
| | | | | 455/41.2 |
| 2014/0323048 | A1* | 10/2014 | Kang | .................... H04W 76/14 |
| | | | | 455/41.2 |

(Continued)

FOREIGN PATENT DOCUMENTS

| | | |
|---|---|---|
| CN | 102483645 A | 5/2012 |
| CN | 103514039 A | 1/2014 |

(Continued)

*Primary Examiner* — Marceau Milord
(74) *Attorney, Agent, or Firm* — Anova Law Group, PLLC

(57) ABSTRACT

A control method includes: establishing a connection by a first electronic device with a second electronic device through a connection component in an activated state; and in response to the established connection, switching, by the first electronic device, a target functional component called by the second electronic device from an inactivated state to an activated state to implement a target function corresponding to the target functional component of the first electronic device. A state of the first electronic device includes: a first state and a second state. When the first electronic device is in the first state, the connection component is in the activated state, the target functional component being in the inactivated state. A power consumption of the first electronic device in the first state is lower than a power consumption of the first electronic device in the second state.

19 Claims, 4 Drawing Sheets

(56) References Cited

U.S. PATENT DOCUMENTS

| | | | | |
|---|---|---|---|---|
| 2016/0029311 A1* | 1/2016 | Wolkowicki | ...... | H04W 52/0251 |
| | | | | 370/311 |
| 2016/0081028 A1* | 3/2016 | Chang | ............... | H04W 52/0229 |
| | | | | 455/566 |
| 2016/0127559 A1* | 5/2016 | Baek | ..................... | H04M 3/543 |
| | | | | 455/417 |
| 2016/0132369 A1* | 5/2016 | Lee | ....................... | G06F 9/5094 |
| | | | | 713/2 |
| 2016/0261425 A1* | 9/2016 | Horton | ............... | G05D 23/1917 |
| 2017/0013153 A1* | 1/2017 | Shin | ................... | H04N 1/00891 |
| 2018/0206177 A1* | 7/2018 | Daoura | ................. | H04W 4/021 |
| 2019/0173543 A1* | 6/2019 | Ganesan | ................. | H01Q 21/28 |
| 2019/0361694 A1* | 11/2019 | Gordon | ................. | G06F 1/1673 |
| 2020/0329426 A1* | 10/2020 | Jin | .......................... | H04W 4/80 |
| 2021/0176810 A1* | 6/2021 | Chae | .................... | H04W 76/18 |

FOREIGN PATENT DOCUMENTS

| | | |
|---|---|---|
| CN | 103906208 A | 7/2014 |
| CN | 104685937 A | 6/2015 |
| CN | 105389747 A | 3/2016 |
| CN | 106030556 A | 10/2016 |
| CN | 108874337 A | 11/2018 |
| CN | 109643546 A | 4/2019 |

\* cited by examiner

|  | Bluetooth Component | EC | AMP Component | Speaker |
|---|---|---|---|---|
| Second State | Active | Active | Active | Active |
| First State | Lower-power State | Active | Shutdown | Shutdown |
FIG. 7
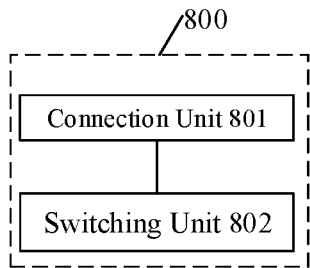
FIG. 8
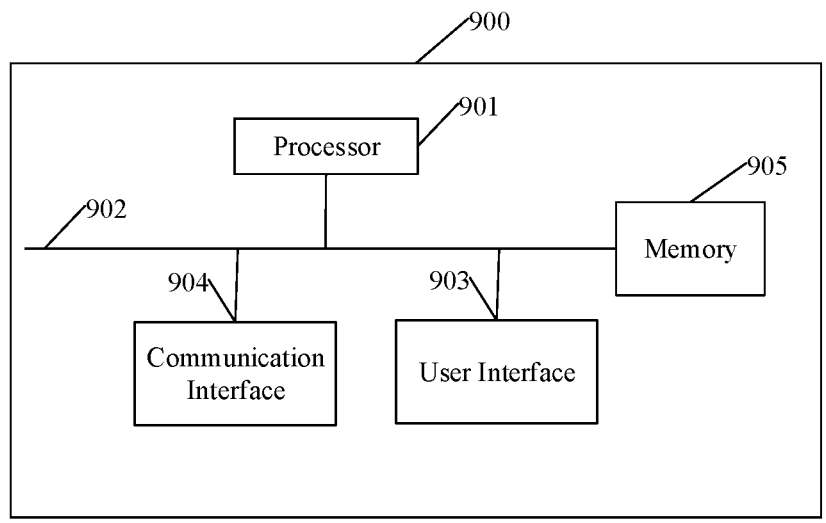
FIG. 9

CONTROL METHOD AND DEVICE

CROSS-REFERENCE TO RELATED DISCLOSURE

The present disclosure claims the priority to Chinese Patent Disclosure Nos. 201910580518.X, entitled "A Control Method and Device", filed on Jun. 28, 2019, the entire content of which is incorporated herein by reference.

TECHNICAL FIELD

The present disclosure relates to control technology, and in particular relates to a control method and device.

BACKGROUND

Advanced Configuration and Power Management Interface (ACPI) defines a new operating interface among Windows 2000, Basic Input Output System (BIOS) and system hardware. These new interfaces include mechanisms that allow Windows 2000 to control power management and device configuration. When the power management state of the personal computer (PC) is in lower-power states such as sleep, dormant, and shutdown, if it is necessary to wake up a component that is in an inactivated state, the user needs to wake up the PC through a key on the keyboard of the PC, mouse or start button. The system of the PC can then be powered up and start again, and switched to the operating state.

SUMMARY

According to one aspect of the present disclosure, a control method is provided. The method includes: establishing a connection by a first electronic device with a second electronic device through a connection component in an activated state; and in response to the established connection, switching, by the first electronic device, a target functional component called by the second electronic device from an inactivated state to an activated state to implement a target function corresponding to the target functional component of the first electronic device. A state of the first electronic device includes: a first state and a second state. When the first electronic device is in the first state, the connection component is in the activated state, the target functional component being in the inactivated state. A power consumption of the first electronic device in the first state is lower than a power consumption of the first electronic device in the second state.

According to another aspect of the present disclosure, an electronic device is provided. The electronic device includes a connection unit and a switching unit. The electronic device is a first electronic device. The connection unit is configured to establish a connection with a second electronic device through a connection component in an activated state. The switching unit is configured to switch a target functional component called by the second electronic device from an inactivated state to the activated state, in response to the established connection, to implement a target function corresponding to the target functional component of the first electronic device. A state of the first electronic device includes: a first state and a second state. When the first electronic device is in the first state, the connection component is in the activated state, and the target functional component is in the inactivated state. A power consumption of the first electronic device in the first state is lower than a power consumption of the first electronic device in the second state.

According to further aspect of the present disclosure, a computer-readable storage medium is provided. The storage medium includes a computer program, when executed, the program causes a processor to: establish a connection between a first electronic device and a second electronic device through a connection component in an activated state; and in response to the established connection, switch a target functional component called by the second electronic device from an inactivated state to an activated state to implement a target function corresponding to the target functional component of the first electronic device. A state of the first electronic device includes: a first state and a second state. When the first electronic device is in the first state, the connection component is in the activated state, and the target functional component is in the inactivated state. A power consumption of the first electronic device in the first state is lower than a power consumption of the first electronic device in the second state.

BRIEF DESCRIPTION OF THE DRAWINGS

FIG. 7 is a schematic state diagram according to the embodiments of the present disclosure;

FIG. 8 is a schematic structural diagram of the first electronic device according to the embodiments of the present disclosure; and FIG. 9 is a schematic structural diagram of the first electronic device according to the embodiments of the present disclosure.

DETAILED DESCRIPTION OF THE EMBODIMENTS

The present disclosure will be described in further detail below with reference to the drawings and embodiments. It should be understood that the embodiments provided here are only used to explain the present disclosure, and are not used to limit the disclosure. In addition, the embodiments provided below are partial embodiments for implementing the present disclosure, rather than providing all the embodiments for implementing the present disclosure. When no conflict exists, the technical solutions described in the embodiments of the present disclosure can be implemented in arbitrary combinations.

In the embodiments of the present disclosure, a first electronic device establishes a connection with the second electronic device through the connection component in an active state; and in response to the established connection, the target functional component called by the second electronic device switches from inactivated state switched to the activated state to implement target function corresponding to the target functional component of the first electronic device; The state of the first electronic device includes: a first state and a second state. When the first electronic device is in the first state, the connection component is in the activated state, and the target functional component is in the inactivated state; a power consumption of the first electronic device in the first state is lower than in the power consumption of the first electronic device in the second state.

According to the embodiments of the present disclosure, a control method is provided, which is applied to the first electronic device. Each function module in the first electronic device may be calculated by hardware resources of the electronic device (e.g., a terminal device, a server, or a server cluster), for example, may be implemented by calculation resources such as a processor and communication resources (e.g., configured to support the implementation of various manners of communication such as optical cable and cellular) in collaboration.

The first electronic device may be any device with information processing capabilities. In one embodiment, the first electronic device may be an intelligent terminal, for example, a mobile terminal with wireless communication capabilities such as a notebook or an augmented reality (AR)/virtual reality (VR) device. In another embodiment, the first electronic device may also be a terminal device with a computing function that is inconvenient to move, such as a desktop computer, desktop computer, server, or the like.

Figure 1:
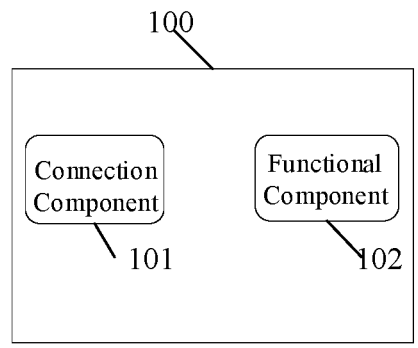
FIG. 1 is a schematic structural diagram of a first electronic device according to the embodiments of the present disclosure.

The first electronic device provided by the embodiment of the present disclosure may be as shown in FIG. 1. The first electronic device 100 includes a connection component 101 and a functional component 102. The connection component is a component that can establish a wireless connection with other electronic devices, such as: a Bluetooth component, a Wi-Fi component, a near field communication (NFC) component, etc. The type of the connection component is not limited to the embodiments of the present disclosure. The functional component may be a component that can support the user's intuitive and sensory functions, such as an audio component, image acquisition component, display component, etc.

In the embodiments of the present disclosure, electronic devices other than the first electronic device may be referred to as the second electronic device. When the first electronic device and the second electronic device are established based on the connection component, the functional component called by the second electronic device is called a target functional component.

The state of the first electronic device includes a first state and a second state, and the power consumption of the first electronic device in the first state is lower than the power consumption of the first electronic device in the second state. The first state of the first electronic device may include one or more of: a shutdown state, a sleep state, a dormant state, and a modern standby state. The second state may be a power-on and normal operation state.

When the first electronic device is in the first state, the connection component is in an active state, and the target functional component is in the inactivated state. The activation state of the connection component may include: a lower power state and an active state. The lower power consumption state may also be referred to as a waiting connection state. The power consumption of the connection component in the lower power consumption state is smaller than the power consumption of the connection component in the active state. The inactivated state is the shutdown state or the dormant state.

In the first state, the power supply in the first electronic device may be in the shutdown state or a power-on state, and the CPU may be in the activated state or the inactivated state. An embedded controller (EC) can be in the activated or inactivated state. In the first state in the embodiments of the present disclosure, the state of the connection component and the functional component may be limited, and the state of other components may not be limited.

In the second state, the connection components in the first electronic device, the CPU and other components are all in the activated state, and the components in the first electronic device can operate normally and interact with user operations.

Figure 2:
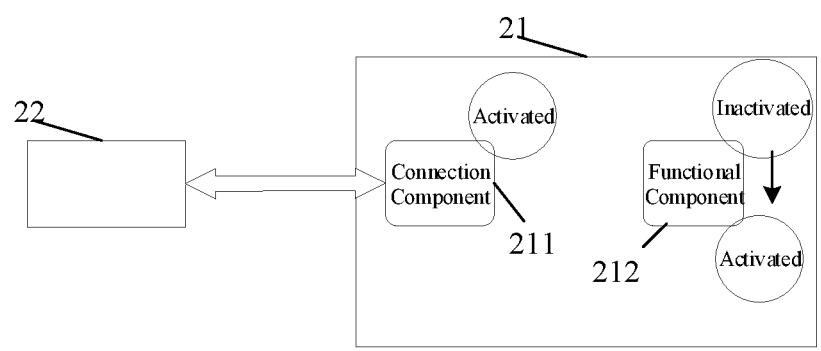
FIG. 2 is a schematic structural diagram of a control system according the embodiments of the present disclosure.

As shown in FIG. 2, the control method provided by the embodiments of the present invention can be applied to the control system shown in FIG. 2. The control system 20 includes: a first electronic device 21 and a second electronic device 22. The first electronic device is in the first state. The first electronic device 21 includes a connection component 211 and a target functional component 212. In the first electronic device 21 in the first state, the connection component is in the activated state, and the target functional component is in the inactivated state. The second electronic device 22 establishes a connection 23 with the first electronic device through the connection component 211 of the first electronic device, and after the connection 23 is established, the first electronic device switches the target functional component from the inactivated state to the activated state.

Of course, the embodiments of the present disclosure are not limited to the provided methods and hardware, and may also have multiple implementations, e.g., may be provided as a storage medium (e.g., stores instructions for executing the control method provided by the embodiments of the present disclosure).

Figure 3:
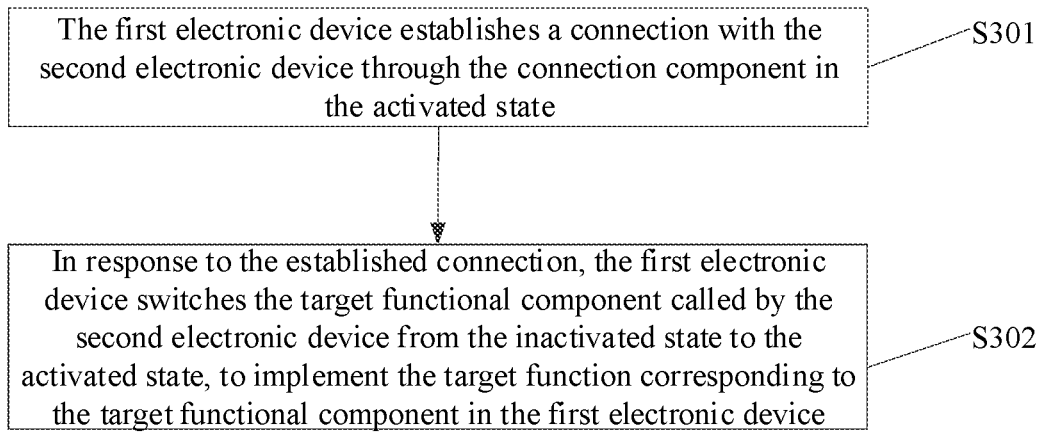
FIG. 3 is a flowchart of a control method according to the embodiments of the present disclosure.

FIG. 3 is a flowchart of a control method according to the embodiments of the present disclosure. As shown in FIG. 3, the control method includes:

S301: The first electronic device establishes a connection with the second electronic device through the connection component in the activated state.

When the first electronic device is in the first state, the power consumption of the first electronic device is lower than the power consumption of the first electronic device in the second state. At this time, the connection component is in the activated state, and a lower power consumption state in which a connection is established with a third device other than the second device or no connection exists between any devices. The connection components may include: Bluetooth component, Wi-Fi component, NFC component, etc.

Based on the different connection components, the connection established by the first electronic device and the second electronic device is different. When the connection component is the Bluetooth component, the connection established by the first electronic device and the second electronic device is a Bluetooth connection; when the connection component is a Wi-Fi component, the connection established by the first electronic device and the second electronic device is a Wi-Fi connection; when the connection component is the NFC component, the connection established by the first electronic device and the second electronic device is an NFC connection.

The establishment of the connection between the first electronic device and the second electronic device may be triggered by the first electronic device or by the second electronic device.

When triggered by the first electronic device, the connection component in the activated state may broadcast a detection message, and when receiving a response message to the detection message, a connection can be established with the second electronic device which sends the response message.

When triggered by the second electronic device, the second electronic device sends a connection request to the first electronic device, and connection component in the activated state can receive the connection request of the second electronic device, and establishes a connection with the second electronic device based on the received connection request.

Before establishing the connection with the second electronic device, the connection component of the first electronic device may analyze the response message or the connection request received from the second electronic device to obtain identity information of the second electronic device carried in the response message or the connection request, and verify the second electronic device based on the obtained identity information. When the verification is passed, a connection is established with the second electronic device, and when the verification is not passed, the connection with the second electronic device is declined. The identity information may include: device identifier, device type, verification information, etc.

When the connection component is in the lower power consumption state, and when receiving a response message or a connection request from the second electronic device, the connection component can be switched to an active state and establish the connection with the second electronic device in the active state.

After the first electronic device establishes the connection with the second electronic device, the first electronic device is still in the first state. At this time, the power consumption of the first electronic device has not changed, or the power consumption has increased based on the state of the connection component but nevertheless is still far lower than the power consumption of the first electronic device in the second state.

S302: In response to the established connection, the first electronic device switches the target functional component called by the second electronic device from the inactivated state to the activated state, to implement the target function corresponding to the target functional component in the first electronic device.

Based on the connection established in step S301, the first electronic device determines the target functional component called by the second electronic device from the included functional components, and switches the target functional component from the inactivated state to the activated state. The inactivated state of the target functional component includes: a state that does not support the implementation of the function, such as a shutdown state, a dormant state, and the like.

The determination of the target functional component called by the second electronic device may be determined according to device features of the second electronic device, or may be determined based on the type of the established connection. For example, when the second electronic device is a video display device, the target functional component may be a camera. In another example, when the established connection is a Bluetooth connection, the target functional component may be an audio output component.

After switching the target functional component to the active state, the first electronic device may still be in the first state, and the difference before and after connection establishment is, that the target functional component is switched from the inactivated state to the activated state.

When the target functional component is switched to the activated state, it can interact with the second electronic device through the connection component in the activated state, and can receive control instruction sent by the second electronic device, and implement the target function corresponding to the target functional component based on the received control instruction.

In the embodiments of the present disclosure, the connection component may directly interact with the target functional component for data, or may use other components (e.g., system components) for data interaction.

In the embodiments of the present disclosure, the target functional component called by the second device may include one or more components. For example, the component called by the second electronic device may be a monitor, and the screen of the second electronic device is displayed on the monitor of the first electronic device. In another example, the components called by the second electronic device include: a microphone and a camera. Image and sound of the current spatial environment are collected through the camera and the microphone of the first electronic device, so that the second electronic device can remotely control the spatial environment of the first electronic device.

According to the control method provided in the embodiments of the present disclosure, when the first electronic device is in the first state, the first electronic device may establish a Wi-Fi connection with the second electronic device based on the Wi-Fi component in the activated state, and based on the Wi-Fi connection, wake up the camera of the first electronic device being in the inactivated state to be in the activated state and implement a monitoring function.

According to the control method provided in the embodiments of the present disclosure, when the first electronic device is in the first state, the first electronic device may establish a Bluetooth connection with the second electronic device based on the Bluetooth component in the activated state, and wake up the Wi-Fi component of the first electronic device being in the inactivated state to be in the activated state based on the Bluetooth connection to implement the Wi-Fi access function, so that the first electronic device and the second electronic device can form a wireless local area network.

According to the control method provided in the embodiments of the present disclosure, the electronic device in the first state can establish a connection with the second electronic device based on the connection component in the activated state, and trigger the switching of the target functional component in the inactivated state to the activated state based on the established connection. Accordingly, when being in the first state, the first electronic device directly can wake up the target functional component, so that the first electronic device can implement the target function corresponding to the target functional component and triggers the target function without changing the state of the first electronic device.

In an embodiment, in step S302, in response to the established connection, switching the target functional component called by the second electronic device from the inactivated state to the activated state includes: in response to the established connection, calling a system component, the system component including at least one of: a central processor and an embedded controller; and switching the target functional component from the inactivated state to the activated state through the system component.

After the connection between the first electronic device and the second electronic device is established, the connection component sends a connection establishment notification to the system component, so that the first electronic device calls the system component. After receiving the connection notification, the system component sends an activation instruction to the target functional component, and switches the target functional component from the inactivated state to the activated state based on the activation instruction. The system component may be a central processor or an embedded controller. The central processor can explain computer instructions and process data in computer software. An embedded controller is a control system that performs specified independent control functions and has the ability to process data in complex ways.

Before calling the target functional component based on the system component, if the system component is in the inactivated state, the system component is awakened to switch the system component to the activated state.

The power consumption of the system components in the inactive state is smaller than the power consumption of the system components in the activated state. If the system component is in the inactivated state, the connection component can send a connection establishment notification to the system component, switch the system component to the active state based on the connection establishment notification, and the system component in the activated state can switch the target functional component from the inactivated state to the activated state. If the system component is in the activated state, the connection component can send the connection establishment notification to the system component, and the system component can directly switch the target functional component from the inactivated state to the activated state.

In an embodiment, before switching the target functional component called by the second electronic device from the inactivated state to the activated state, the method further includes: determining target functional component called by the second electronic device by determining the device features of the second electronic device. The device features of the second electronic device includes at least one of: device identifier and device type.

Figure 4:
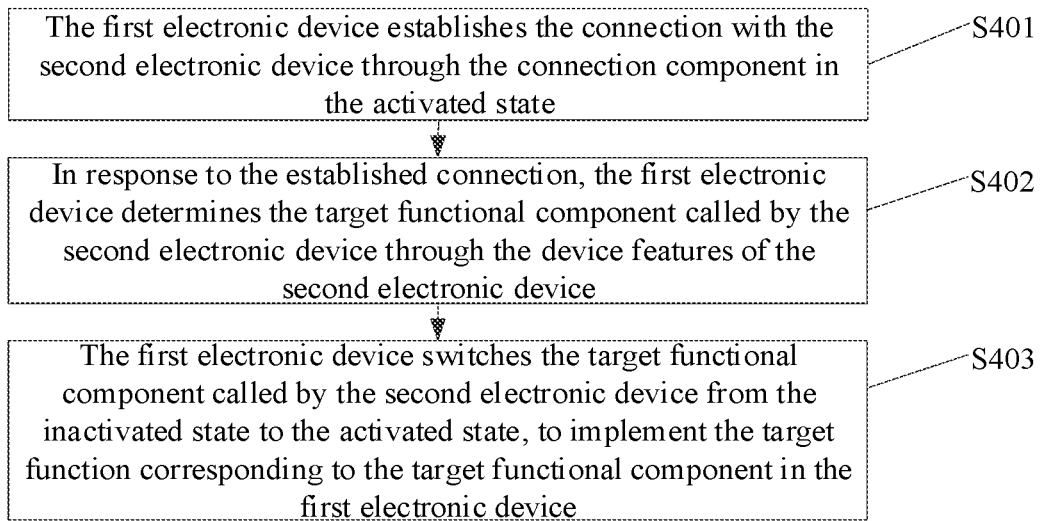
FIG. 4 is a flowchart of the control method according to the embodiments of the present disclosure.

The control method provided by the embodiment of the present disclosure may be as shown in FIG. 4, including:

S401: The first electronic device establishes the connection with the second electronic device through the connection component in the activated state;

S402: In response to the established connection, the first electronic device determines the target functional component called by the second electronic device through the device features of the second electronic device.

When the connection component establishes the connection with the second electronic device, the device features of the second electronic device may be obtained based on the response message or connection request interacted with the second electronic device. The device features of the second electronic device at least includes one of: device identifier and device type.

The second electronic device determines the target functional component called by the second electronic device based on the electronic device features of the second electronic device. For example, if the device identifier of the second electronic device is ID1, and the component corresponding to ID1 is an indicator light, then it is determined that the target functional component is an indicator light. In another example, if the device type of the second electronic device is a mobile phone, and the component corresponding to the mobile phone is a speaker, it is determined that the target functional component is a speaker.

In an embodiment, determining the target functional component called by the second electronic device through the device features of the second electronic device may include: determining the functional component information corresponding to the device features based on a control list, the functional component corresponding to the functional component information is the target functional component called by the second electronic device. The control list includes different device identifiers and functional component information corresponding to each device identifier; or, the control list includes different device types and functional component information corresponding to each device type.

The first electronic device may include a control list, and a correspondence between different device features and corresponding functional component information may be set in the control list. The device features in the control list may be device identifier, device type, or a combination of device identifier and device type.

Figure 5:
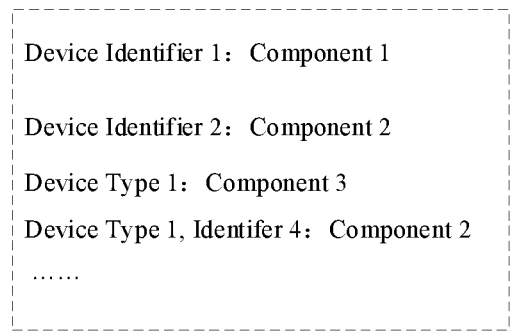
FIG. 5 is a schematic diagram of a control list according to the embodiments of the present disclosure.

In one example, the content of the control list may be as shown in FIG. 5, the functional component information corresponding to the device identifier 1 is component 1, the functional component information corresponding to the device identifier 2 is component 2, the functional component corresponding to the device type 1 is component 3, and the functional component corresponding to device type 1 and device identifier 4 is component 2.

In the embodiments of the present disclosure, the correspondence in the control list may be set by the system device or by the user.

When the correspondence in the control list is set by the user, the first electronic device can load the setting page under the normal power-on state, receive the user's setting operation based on the setting page, and update the correspondence in the control list based on the user's setting operation. A setting type of the setting operation may include: adding, deleting, modifying, and other operations, etc. When the setting type of the setting operation is an adding operation, a new correspondence between the device features and the functional component information can be added to the control list, and the added correspondence can be one or more. When the setting type of the setting operation is a delete operation, the existing correspondence between the device features and the functional component information can be deleted in the control list, and the added correspondence can be one or more. When the setting type of the setting operation is a modification operation, the existing correspondence between the device features and the functional component information can be modified in the control list, and the modified correspondence can be one or more.

S403: The first electronic device switches the target functional component called by the second electronic device from the inactivated state to the activated state, to implement the target function corresponding to the target functional component in the first electronic device.

The implementation of S401 and S403 shown in FIG. 4 can refer to the description of S301 and S303.

In the embodiments of the present disclosure, after the connection between the first electronic device and the second electronic device is established, the called target functional component is determined based on the device features of the second electronic device, thereby enabling the user to trigger the first electronic device to implement different functions based on different second electronic devices.

In an embodiment, the connection component may include a Bluetooth component. The first electronic device establishes a connection with the second electronic device through the active connection component, including: the first electronic device scans the Bluetooth access information through the Bluetooth component; and based on the Bluetooth access information of the second electronic device that was scanned by the Bluetooth component, the first electronic device establishes the Bluetooth connection with the second electronic device.

When the connection component is the Bluetooth component, the first electronic device is in the first state, and the Bluetooth component may be in the lower power state or the active state.

The active Bluetooth component can work in master device mode or slave mode.

When the Bluetooth component is in the master device mode, it can search surrounding devices, search for the Bluetooth signals of the surrounding devices, scan the Bluetooth access information carried by the Bluetooth signals of the surrounding devices, and select a device having the Bluetooth access information that matches Bluetooth pairing information of the first electronic device as the second electronic device and establishes the connection with the second electronic device.

When the Bluetooth component is in the slave device mode, it can send out the Bluetooth signal and be searched by the surrounding device that are operating in the master device mode. When a surrounding device finds the first electronic device, it can send a connection request to the first electronic device, request to establish the Bluetooth connection with the first electronic device. The sent connection request carries the Bluetooth access information. When the first electronic device determines that the received Bluetooth access information matches the Bluetooth pairing information of the first electronic device, the device that sends the connection request can be considered the second electronic device, and the Bluetooth connection can be established with the second electronic device.

When the connection component is the Bluetooth connection, the target functional component may be any functional component other than the Bluetooth component, such as Wi-Fi component, audio component, image acquisition component, display component, and so on.

In an embodiment, the target functional component includes: an audio component. In response to the established connection, the target functional component called by the second electronic device can be switched from the inactivated state to the activated state to implement target function corresponding to the target functional component in the first electronic device, including: in response to the established connection, the audio component called by the second electronic device can be switched from the inactivated state to the activated state, to implement an audio output function of the audio component.

When the target functional component includes an audio component, the connection component may be any component that can be used to establish a connection, such as a Bluetooth component, a Wi-Fi component, and an NFC component.

After establishing a connection with the second electronic device based on the connection component, the first electronic device switches the audio component from the inactivated state to the activated state. In the embodiments of the present disclosure, the audio component may include one or more of: a speaker, a microphone, and an audio power amplifier (AMP) for audio data processing.

According to the method provided by the embodiments of the present disclosure, when the second electronic device is playing music, making a call, or playing a video, a connection can be established with the connection component of the first electronic device in the first state, and plays audio of the second device through the audio component.

In an embodiment, the illustrated method may further include: obtaining a target input operation; if the target input operation complies with a disconnection rule, disconnecting the established connection between the first electronic device and the second electronic device.

In the embodiments of the present disclosure, a physical button may be provided on the first electronic to receive the target input operation through the physical button, and determine whether to disconnect the first electronic device and the second electronic, based on whether the target input operation complies with the disconnection rule. When the target input operation conforms to the disconnection rule, the first electronic device and the second electronic device can be disconnected; and when the target input operation does not comply with the disconnection rule, the connection between the first electronic device and the second electronic device can be maintained, and no response may be made to the target input operation.

The disconnection rule may be, for example, duration is greater than a set duration threshold, pressing pressure is greater than a set pressure threshold, duration interval between consecutive operations is less than a set interval threshold, etc. The specific content of the disconnection rule is not limited in the embodiments of the present disclosure.

In an embodiment, in response to the disconnection, the target functional component called by the second electronic device can be switched from the activated state to the inactivated state.

After disconnecting the connection with the second electronic device, the first electronic device switches the target functional component called by the second electronic device from the activated state to the inactivated state, thereby reducing the power consumption of the first electronic device in the first state.

In one example, after the first electronic device is disconnected from the second electronic device, the target functional component called by the second electronic device can be switched from the activated state to the inactivated state.

In another example, after the first electronic device is disconnected from the second electronic device, the target functional component called by the second electronic device can be switched from the activated state to the inactivated state after a set time threshold. In practical applications, when the second electronic device establishes the connection with the first electronic device again based on the connection component within the set time threshold, the target function can be implemented based on the target functional component in the activated state.

The control method provided by the embodiments of the present disclosure will be described below by taking the Bluetooth component as the connection component and the audio component as the target functional component as an example.

Figure 6:
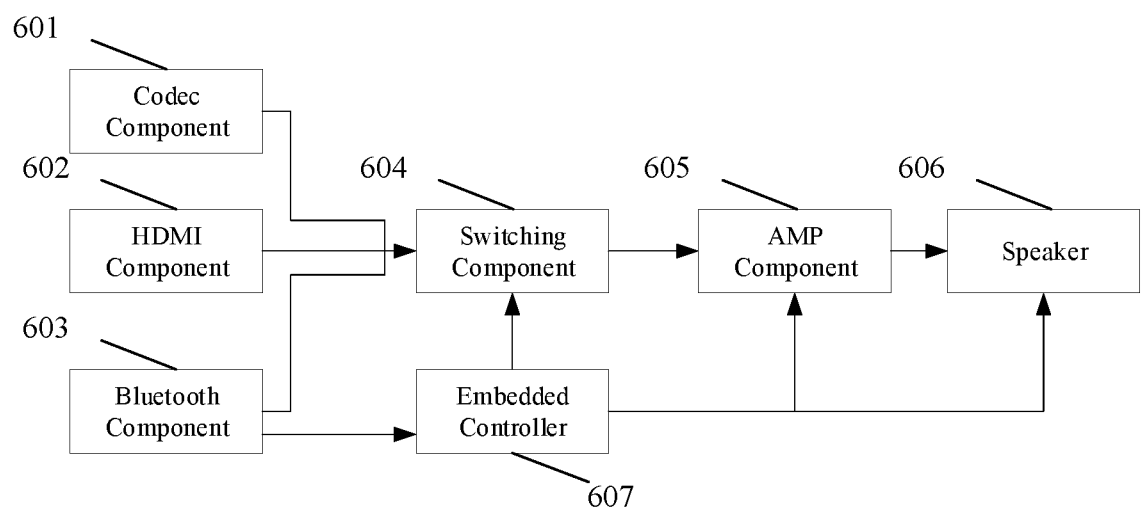
FIG. 6 is a schematic structural diagram of the first electronic device according to the embodiments of the present disclosure.

The structure of the first electronic device is shown in FIG. 6. The components of the first electronic device may include: a codec component 601, a high definition multimedia interface (HDMI) component 602, a Bluetooth component 603, a switching component 604, and an AMP component 605, speaker 606 and EC 607. The codec component 601, the HDMI component 602, and the Bluetooth component 603 are respectively connected to one end of the switching component 604, the other end of the switching component 604 is connected to the AMP component 605, and the AMP component 605 is connected to the speaker 606. The codec component 601, the HDMI component 602, and the Bluetooth component 603 can output audio signals. The EC 607 is connected to the Bluetooth component, and controls the switching component 605, which can be a multiplexer. The speaker 606 may include a plurality of speakers with different powers, e.g., 3 watt or 5 watt speakers.

When the first electronic device is in the second state, that is, the normal operating state, the codec component 601, the HDMI component 602, the Bluetooth component 603, the switching component 604, the AMP component 605, and the speaker 606 are all in the activated state; and the switching component 604 selects one audio signal from: the codec component 601, HDMI component 602, and Bluetooth component 603, and output the selected audio signal through the AMP component 605 and speaker 606.

When the first electronic device is in the first state, the Bluetooth component 603 is in the activated state, and the codec component 601, the HDMI component 602, the switching component 604, the AMP component 605, and the speaker 606 are all in the inactivated state. The first state may be in the shutdown state (S5), the dormant state S4, the sleep state (S3), or an intelligent standby state.

After the first electronic device establishes a connection with the second electronic device based on the Bluetooth component 603, the Bluetooth component 603 notifies the EC 607, and the EC 607 sends a wake-up instruction to the switching component 604, the AMP component 605, and the speaker 606 to switch the switching component 604, the AMP component 605, and the speaker 606 from the inactivated state to the activated state.

When the EC is in the inactive state, after the Bluetooth component 603 notifies the EC607, the EC607 can be switched from the inactivated state to the activated state.

After the switching component 604, the AMP component 605 and the speaker 606 are switched to the active state, the Bluetooth component 603 receives the audio data sent by the second electronic device, and outputs the audio data that are sent from the second electronic device through the switching component 604, the AMP component 605 and the speaker 606.

When the first electronic device is in the first state and the second state, the states of the Bluetooth component, EC, AMP component, and speaker may be as shown in FIG. 7, and the first electronic device is in the first state, the Bluetooth component, EC, AMP component, and speaker are all in the activated state. When the first electronic device is in the first state, the Bluetooth component is in the lower-power state of the active state, the EC is in the active state of the activated state, and the AMP component and the speaker are in the shutdown state of the inactivated state.

To implement the method according to the embodiments of the present disclosure, the embodiments of the present disclosure provide an electronic device 800, which is the first electronic device in the above control method. As shown in FIG. 8, the first electronic device 800 may include: a connection unit 801 configured to establish a connection with the second electronic device through the connection component in the activated state; a switching unit 802 configured to switch the target functional component called by the second electronic device from the inactivated state to the activated state in response to the established connection to implement the target function corresponding to the target functional component of the first electronic device.

The states of the first electronic device include: the first state and the second state. When the first electronic device is in the first state, the connection component is in the activated state, the target functional component is in inactivated state, and the power consumption of the first electronic device in the first state is lower than the power consumption of the first electronic device in the second state.

In an embodiment, the switching unit 802 is configured to: in response to the established connection, call a system component, the system component including at least one of: a central processor and an embedded controller; and through the system component, switch the target functional component from the inactivated state to the activated state.

In an embodiment, the first electronic device 800 may further include: a wake-up unit configured to: if the system component is in the inactivated state, wake up the system component to switch the system component to the activated state.

In an embodiment, the first electronic device 800 may further include: a determination unit configured to: before switching the target functional component called by the second electronic device from the inactivated state to the activated state, determine the target functional component called by the second electronic device through the device features of the second electronic device;

The device features of the second electronic device include at least one of: a device identifier and a device type.

In an embodiment, the determining unit is further configured to determine the functional component information corresponding to the device features based on the control list. The functional component information corresponding to the functional component is a target functional component called by the second electronic device.

The control list includes different device identifiers and the functional component information corresponding to each device identifier; or, the control list includes different device types and the functional component information corresponding to each device type.

In an embodiment, the connection component includes: a Bluetooth component. And the connection unit is further configured to: scan Bluetooth access information through the Bluetooth component; based on the Bluetooth access information of the second electronic device scanned by the Bluetooth component, establish a Bluetooth connection with the second electronic device.

In an embodiment, the target functional component includes: an audio component. And the switching unit is further configured to: in response to the established connection, switch the audio component called by the second electronic device from the inactivated state to the activated state, to implement an audio output function of the audio component.

In an embodiment, the first electronic device 800 may further include a disconnection unit, being configured to: obtain a target input operation; and if the target input operation complies with a disconnection rule, disconnect the established connection between the first electronic device and the second electronic device.

In an embodiment, the first electronic device 900 may further include: a switching unit configured to switch the target functional component called by the second electronic device from the activated state to the inactivated state in response to the disconnection.

The first electronic device provided by the embodiments of the present disclosure includes: a processor and a memory for storing a computer program that can be run on the processor. The processor performs the steps of the above control method when it is configured to run the computer program. As shown in FIG. 9, the first electronic device 900 provided by the embodiment of the present disclosure includes a processor 901, at least one communication bus 902, a user interface 903, at least one external communication interface 904, and a memory 905. The communication bus 902 is configured to implement connection among these components. The user interface 903 may include a touch interface and a key switch for interacting with the user, and the external communication interface 904 may include a standard wired interface and a standard wireless interface. The user interface 903 may include functional components such as a camera, a speaker, and a microphone.

The processor 901 is configured to execute the computer program stored in the memory to implement the following steps: establish a connection with the second electronic device through the connection component in the activated state; and in response to the established connection, switch the target functional component called by the second electronic device from the inactivated state to the activated state, to implement the target function corresponding to the target functional component in the first electronic device.

The states of the first electronic device include: a first state and a second state. When the first electronic device is in the first state, the connection component is in the activated state, the target functional component is in the inactivated state, and the power consumption of the first electronic device in the first state is lower than the power consumption of the first electronic device in the second state.

It can be understood that the memory 902 may be a volatile memory or a non-volatile memory, and may also include both volatile and non-volatile memory. The non-volatile memory can be read-only memory (ROM), programmable read-only memory (PROM), erasable programmable read-only memory (EPROM), electrically erasable programmable read-only memory (EEPROM), ferromagnetic random-access memory (FRAM), flash memory, magnetic surface memory, compact disc, or read-only compact disc (CD-ROM). The magnetic surface storage can be disk storage or tape storage. The volatile memory may be a random-access memory (RAM), which is used as an external cache. By way of example but not limitation, many forms of RAM are available, such as static random-access memory (SRAM), synchronous static random-access memory (SSRAM), dynamic random-access Memory (DRAM), synchronous dynamic random-access memory (SDRAM), double data rate synchronous dynamic random-access memory (DDRSDRAM), enhanced synchronous dynamic random-access memory (ESDRAM), SyncLink dynamic random-access memory (SLDRAM), direct rambus random-access memory (DRRAM). The memory 902 described in the embodiments of the present disclosure is intended to include but is not limited to these and any other suitable types of memories.

The memory 902 in the embodiments of the present disclosure is configured to store various types of data to support the operation of the first electronic device of the embodiments.

The method disclosed in the above embodiments of the present disclosure may be applied to the processor 901, or implemented by the processor 901. The processor 901 may be an integrated circuit chip with signal processing capabilities. In the implementation process, each step of the above method may be completed by an integrated logic circuit of hardware in the processor 901 or an instruction in the form of software. The foregoing processor 901 may be a general-purpose processor, a digital signal processor (DSP), or other programmable logic devices, discrete gates or transistor logic devices, discrete hardware components, etc. The processor 901 may implement or execute the methods, steps, and logical block diagrams disclosed in the embodiments of the present disclosure. The general-purpose processor may be a microprocessor or any conventional processor. In combination with the steps of the control method disclosed in the embodiments of the present disclosure, it can be directly embodied as being executed by a hardware decoding processor, or executed and completed by a combination of hardware and software modules in the decoding processor. The software module may be located in a storage medium. The storage medium is located in the memory 902. The processor 901 reads the information in the memory 902 and completes the steps of the foregoing control method in combination with its hardware.

In an exemplary embodiment, the first electronic device in the embodiment may be one or more application-specific integrated circuits (ASIC), DSP, programmable logic device (PLD), complex programmable Logic device (CPLD), field-programmable gate array (FPGA), general-purpose processor, controller, microcontroller unit (MCU), microprocessor, or other electronic components to implement the aforementioned control method.

In the embodiments of the present disclosure, if the above control method is implemented in the form of a software function module and sold or used as an independent product, it may also be stored in a computer-readable storage medium. Based on such understanding, the technical solutions of the embodiments of the present disclosure in essence or the part that makes contributions to the prior art can be embodied in the form of software products. The computer software products are stored in a storage medium and include several instructions for a computer device (which may be a personal computer, server, or network device, etc.) to execute all or part of the methods described in the embodiments of the present disclosure. The foregoing storage medium include various mediums that can store program codes, such as a U disk, a mobile hard disk, an ROM, a magnetic disk, or an optical disk. Accordingly, the embodiments of the present disclosure are not limited to any specific combination of hardware and software.

Correspondingly, an embodiment of the present disclosure further provides a storage medium, that is, a computer-readable storage medium. A computer program is stored in the storage medium, and when the computer program is executed by the processor, the steps of the foregoing control method can be implemented.

The above description of the first electronic device and storage medium embodiment is similar to the description of the above method embodiment, and has similar beneficial effects as the method embodiment. For technical details not disclosed in the first electronic device and computer readable storage medium embodiments of the present disclosure, description of the method embodiments of the present disclosure may be referred to for understanding.

It should be understood that "one embodiment" or "an embodiment" mentioned throughout the specification means that a specific feature, structure, or feature related to the embodiment is included in at least one embodiment of the present disclosure. Therefore, "in one embodiment" or "in an embodiment" that appears throughout the specification does not necessarily refer to the same embodiment. Furthermore, these specific features, structures, or features may be combined in one or more embodiments in any suitable manner. It should be understood that in various embodiments of the present disclosure, the serial number of each above process does not mean the sequence of the execution, and the execution sequence of each process should be determined by its function and inherent logic, and should not be construed as limitations to the embodiments of the present disclosure. The serial numbers of the above embodiments of the present disclosure are for description only, and do not represent the advantages and disadvantages of the embodiments.

It should be noted that in this article, the terms "include", "include" or any other variant thereof are intended to cover non-exclusive inclusion, so that a process, method, article or device that includes a series of elements includes not only those elements, but also other elements that are not explicitly listed, or include elements inherent to such processes, methods, objects, or devices. Without more restrictions, the element defined by the sentence "include one" does not exclude other identical elements in the process, method, article or device that includes the element.

In the several embodiments provided in the present disclosure, it should be understood that the disclosed device and method may be implemented in other manners. The device embodiments described above are only schematic. For example, the division of the units is only a logic function division, and in actual implementation, there may be another division manner. For example, multiple units or components may be combined, or can be integrated into another system, or some features can be ignored or not implemented. In addition, the coupling or direct coupling or connection between the components as displayed or discussed may be through some interfaces and the indirect coupling or connection of the device or unit, and may be electrical, mechanical, or other forms.

The units described as separate components may or may not be physically separated, and the components displayed as units may or may not be physical units. They may be located in one place or distributed to multiple network units. Some or all of the units may be selected according to actual needs to achieve the purpose of the solution of the embodiments.

In addition, the functional units in the embodiments of the present disclosure may all be integrated into one processing unit, or each unit may be separately used as a unit, or two or more units may be integrated into one unit. The above integrated unit can be implemented in the form of hardware, or in the form of hardware plus software functional units.

Those of ordinary skill in the art may understand that all or part of the steps to implement the above method embodiments may be completed by program instructions related hardware. The foregoing program may be stored in a computer-readable storage medium. When the program is executed, the execution includes the steps of the foregoing method embodiments; and the foregoing storage medium includes various mediums that can store program codes, such as a mobile storage device, an ROM, a magnetic disk, or an optical disk.

Alternatively, if the integrated unit described above is implemented in the form of a software function module and sold or used as an independent product, it may also be stored in a computer-readable storage medium. Based on such understanding, the technical solutions of the embodiments of the present disclosure in essence or the part that contributes to the prior art can be embodied in the form of software products. The computer software products are stored in a storage medium and include several instructions for a computer device (which may be a personal computer, server, or network device, etc.) to execute all or part of the methods described in the embodiments of the present disclosure. The foregoing storage medium include various media that can store program codes, such as a mobile storage device, a ROM, a magnetic disk, or an optical disk.

The above is only the specific implementation of the present disclosure, but the scope of the disclosure is not limited to this, variations or substitutions within the technical scope disclosed in the present disclosure that any person skilled in the art can easily think of should be covered by the scope of the disclosure. Therefore, the scope of the disclosure shall be subject to the scope of the claims.

What is claimed is:

1. A control method, comprising:
    establishing a connection by a first electronic device in a first state with a second electronic device through a connection component in an activated state; and
    in response to the established connection, switching, by the first electronic device, a target functional component included in the first electronic device and called by the second electronic device from an inactivated state to an activated state to implement a target function corresponding to the target functional component of the first electronic device while maintaining the first electronic device in the first state;
    wherein:
        a state of the first electronic device includes: the first state and a second state;
        when the first electronic device is in the first state, the connection component is in the activated state, and the target functional component is switchable between the inactivated state and the activated state; and
        a power consumption of the first electronic device in the first state is lower than a power consumption of the first electronic device in the second state.

2. The method according to claim 1, wherein in response to the established connection, switching the target functional component called by the second electronic device from the inactivated state to the activated state comprises:
    in response to the established connection, calling a system component, the system component comprising at least one of: a central processor or an embedded controller; and
    through the system component, switching the target functional component from the inactivated state to the activated state.

3. The method according to claim 2, further comprising:
    in response to the system component being in the inactivated state, waking up the system component by the first electronic device to switch the system component to the activated state.

4. The method according to claim 1, further comprising:
    before switching the target functional component called by the second electronic device from the inactivated state to the activated state, determining, by the first electronic device, the target functional component called by the second electronic device through device features of the second electronic device;
    wherein:
        the device features of the second electronic device comprise at least one of: a device identifier or a device type.

5. The method according to claim 4, wherein determining the target functional component called by the second electronic device through the device features of the second electronic device, comprising:
    determining functional component information corresponding to the device features based on a control list, the functional component corresponding to the functional component information being the target functional component called by the second electronic device;

wherein:

the control list includes: device identifiers and functional component information corresponding to each device identifier, or different device types and functional component information corresponding to each device type.

6. The method according to claim 1, wherein:

the connection component includes: a Bluetooth component; and establishing the connection by the first electronic device with the second electronic device through the connection component in the activated state comprises:

scanning Bluetooth access information by the first electronic device through the Bluetooth component; and establishing a Bluetooth connection by the first electronic device with the second electronic device based on the Bluetooth access information of the second electronic device that are scanned by the Bluetooth component.

7. The method according to claim 1, wherein:

the target functional component comprises: an audio component; and in response to the established connection, switching the target functional component called by the second electronic device from the inactivated state to the activated state to implement the target function corresponding to the target functional component in the first electronic device, comprises:

in response to the established connection, switching the audio component called by the second electronic device from an inactivated state to an activated state, to implement an audio output function of the audio component.

8. The method according to claim 1, further comprising:

obtaining a target input operation by the first electronic device; and in response to the target input operation complying with a disconnection rule, disconnecting the first electronic device from the second electronic device.

9. The method according to claim 8, further comprising:

in response to the disconnection, switching by the first electronic device the target functional component called by the second electronic device from the activated state to the inactivated state.

10. An electronic device, comprising:

a memory storing a computer program; and a processor configured to execute the computer program to:

establish a connection between a first electronic device in a first state and a second electronic device through a connection component in an activated state, the electronic device being the first electronic device;

switch a target functional component included in the first electronic device and called by the second electronic device from an inactivated state to the activated state, in response to the established connection while maintaining the first electronic device in the first state, to implement a target function corresponding to the target functional component of the first electronic device;

wherein:

a state of the first electronic device includes: the first state and a second state;

when the first electronic device being in the first state, the connection component being in the activated state, and the target functional component being switchable between the inactivated state and the activated state; and a power consumption of the first electronic device in the first state being lower than a power consumption of the first electronic device in the second state.

11. A computer-readable storage medium, comprising: a computer program, when executed, the program causing a processor to:

establish a connection between a first electronic device in a first state and a second electronic device through a connection component in an activated state; and in response to the established connection, switch a target functional component included in the first electronic device and called by the second electronic device from an inactivated state to an activated state to implement a target function corresponding to the target functional component of the first electronic device while maintaining the first electronic device in the first state;

wherein:

a state of the first electronic device includes: the first state and a second state;

when the first electronic device being in the first state, the connection component being in the activated state, and the target functional component being switchable between the inactivated state and the activated state; and a power consumption of the first electronic device in the first state being lower than a power consumption of the first electronic device in the second state.

12. The computer-readable storage medium according to claim 11, wherein in response to the established connection, switching the target functional component called by the second electronic device from the inactivated state to the activated state comprises:

in response to the established connection, calling a system component, the system component comprising at least one of: a central processor or an embedded controller; and through the system component, switching the target functional component from the inactivated state to the activated state.

13. The computer-readable storage medium according to claim 11, wherein in response to the established connection, switching the target functional component called by the second electronic device from the inactivated state to the activated state further comprises:

in response to the system component being in the inactivated state, waking up the system component by the first electronic device to switch the system component to the activated state.

14. The computer-readable storage medium according to claim 11, wherein the processor is further configured to:

before switching the target functional component called by the second electronic device from the inactivated state to the activated state, determining, by the first electronic device, the target functional component called by the second electronic device through device features of the second electronic device;

wherein:

the device features of the second electronic device comprise at least one of: a device identifier or a device type.

15. The computer-readable storage medium according to claim 14, wherein determining the target functional component called by the second electronic device through the device features of the second electronic device, comprising:
   determining functional component information corresponding to the device features based on a control list, the functional component corresponding to the functional component information being the target functional component called by the second electronic device;
   wherein:
      the control list includes: device identifiers and functional component information corresponding to each device identifier, or different device types and functional component information corresponding to each device type.

16. The computer-readable storage medium according to claim 11, wherein:
   the connection component includes: a Bluetooth component; and
   establishing the connection by the first electronic device with the second electronic device through the connection component in the activated state comprises:
      scanning Bluetooth access information by the first electronic device through the Bluetooth component; and
      establishing a Bluetooth connection by the first electronic device with the second electronic device based on the Bluetooth access information of the second electronic device that are scanned by the Bluetooth component.

17. The computer-readable storage medium according to claim 11, wherein:
   the target functional component comprises: an audio component; and
   in response to the established connection, switching the target functional component called by the second electronic device from the inactivated state to the activated state to implement the target function corresponding to the target functional component in the first electronic device, comprises:
      in response to the established connection, switching the audio component called by the second electronic device from an inactivated state to an activated state, to implement an audio output function of the audio component.

18. The computer-readable storage medium according to claim 11, wherein the processor is further configured to:
   obtain a target input operation by the first electronic device; and
   in response to the target input operation complying with a disconnection rule, disconnect the first electronic device from the second electronic device.

19. The computer-readable storage medium according to claim 18, wherein the processor is further configured to:
   in response to the disconnection, switching by the first electronic device the target functional component called by the second electronic device from the activated state to the inactivated state.

* * * * *